F. WEIHN.
SADDLE CLAMP FOR CYCLES.
APPLICATION FILED JULY 23, 1908.

906,972.

Patented Dec. 15, 1908.

Witnesses:
W. R. Schulz
Arthur E. Gumpo

Inventor:
Friedrich Weihn
by his attorney

UNITED STATES PATENT OFFICE.

FRIEDRICH WEIHN, OF HANOVER, GERMANY.

SADDLE-CLAMP FOR CYCLES.

No. 906,972.

Specification of Letters Patent.

Patented Dec. 15, 1908.

Application filed July 23, 1908. Serial No. 444,910.

*To all whom it may concern:*

Be it known that I, FRIEDRICH WEIHN, a subject of the German Emperor, and residing at Hanover, Germany, have invented new and useful Improvements in Saddle-Clamps for Cycles, of which the following is a specification.

This invention relates to saddle clamps for cycles and has for its object to provide a device whereby a saddle may be so mounted on the cycle as to have a limited rotary movement about a vertical pivot the height of the saddle being less than that of rotary saddles hitherto used.

According to this invention the clasp or split collar whereby the saddle is secured to the frame or seat pillar is connected to a disk by means of a vertical pin about which rotates the member to which the under frame or springs of the saddle are connected, ball bearings being provided between the disk and upper surface of the rotary member and between the lower surface of the latter and the supporting lug of the whole device. To limit the movement of the rotary member stops are formed on the latter, these stops coöperating with slots in the bearing disk. The drawback hitherto experienced in cases where the stops come in contact with the saddle springs is thus obviated and the supporting clips of the springs are thus no longer loosened as was hitherto the case.

Figure 1:
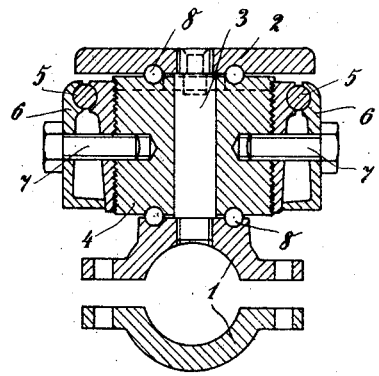
Figure 2:
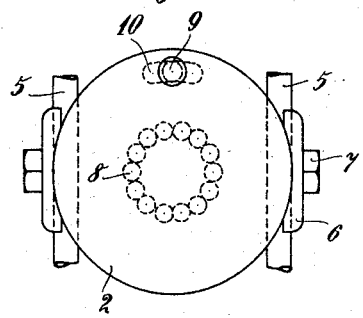
Figure 3:
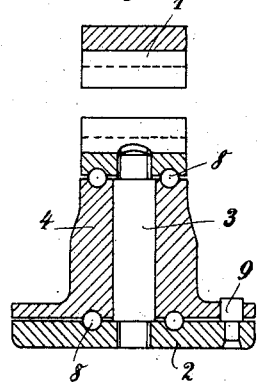

Two constructions of attachment device according to this invention by way of example in the accompanying drawings in which, Figure 1 is a vertical section, Fig. 2 is a plan thereof and Fig. 3 is a vertical section of a modified form of device.

In the construction shown in Figs. 1 and 2 the clasp or split collar 1 which supports the whole device is connected to a bearing disk 2 by means of a comparatively stout pin 3 which forms a pivot for the rotary member or sleeve 4 to which the clip 6 for the saddle frame or springs 5 are secured by means of bolts 7. Between the clasp 1 and the rotary member 4 as well as between the latter and the bearing disk 2 are arranged antifriction balls 8 which assist rotation. The rotary movement of the member 4 is limited by a pin or stud 9 secured to the bearing disk 2 which coöperates with a groove or slot 10 in the upper surface of the member 4. If the clasp 1 is mounted on the cycle frame the saddle carried by the clip 6 will be rotatable to an extent determined by the length of the slot 10 and the thickness of the pin 9. The position of the disk 2 may be either above or below the lug 1.

In the construction shown in Fig. 3 the disk 2 is disposed below the clasp 1 and supports the rotary member 4.

It will be understood that by providing clamps of standard type on the rotary member any existing saddle may be made to possess the characteristics hitherto possessed only by rotary saddles. The device is preferably so mounted on the frame of the cycle or on the saddle pillar that the saddle clips are below the clasp which supports the whole device and are thus concealed from view.

What I claim is:

A saddle clamp for cycles, comprising a clasp, a disk, a connecting pin, a slotted sleeve rotatable on the pin, ball bearings interposed between sleeve and clasp and between sleeve and disk, respectively, a stud on the disk engaging the sleeve-slot, and means for securing a saddle to said sleeve, substantially as specified.

Signed by me at Hanover, Germany, this 9th day of July, 1908.

FRIEDRICH WEIHN.

Witnesses:
    ROBERT J. THOMPSON,
    W. M. SCHNE.